US005237407A

United States Patent [19]

Crezee et al.

[11] Patent Number: 5,237,407

[45] Date of Patent: Aug. 17, 1993

[54] METHOD AND APPARATUS FOR MEASURING THE COLOR DISTRIBUTION OF AN ITEM

[75] Inventors: Leonard P. Crezee, Snelrewaard; Adrianus M. de Vries, Gouda, both of Netherlands

[73] Assignee: Aweta B.V., Nootdorp, Netherlands

[21] Appl. No.: 856,404

[22] Filed: Mar. 23, 1992

[30] Foreign Application Priority Data

Feb. 7, 1992 [NL] Netherlands ..................... 9200236

[51] Int. Cl.[5] ..................... H04N 7/18

[52] U.S. Cl. ..................... 358/107; 358/101; 358/106; 356/407; 356/425

[58] Field of Search ..................... 358/10, 27, 28, 101, 358/106, 107; 209/593; 356/407, 425

[56] References Cited

U.S. PATENT DOCUMENTS

| | | | |
|---|---|---|---|
| 4,106,628 | 8/1978 | Warkentin et al. | 209/593 |
| 4,246,098 | 1/1981 | Conway et al. | 209/558 |
| 4,259,020 | 3/1981 | Babb | 356/407 |
| 4,281,933 | 8/1981 | Houston et al. | 356/425 |
| 4,308,959 | 1/1982 | Hoover et al. | 358/106 |
| 4,314,279 | 2/1982 | Yoshida | 358/213.19 |
| 4,515,275 | 5/1985 | Mills et al. | 358/106 |
| 4,790,022 | 12/1988 | Dennis | 358/106 |
| 4,984,073 | 1/1991 | Lemelson | 358/93 |
| 5,020,675 | 6/1991 | Cowlin et al. | 358/106 |
| 5,030,001 | 7/1991 | Vande Vis | 356/53 |
| 5,164,795 | 11/1992 | Conway | 356/425 |

*Primary Examiner*—Howard W. Britton
*Assistant Examiner*—Richard Lee
*Attorney, Agent, or Firm*—Griffin, Butler, Whisenhunt & Kurtossy

[57] ABSTRACT

A method and an apparatus for measuring the color distribution of an item wherein the item is rotated in the field of view of a camera and successive line images of the item parallel to the axis of rotation of the item are measured and the data contents of the picture elements of the successive line images of the surface of the item are processed. In an embodiment in which the camera is a matrix camera, the item is at the same time transported through the field of view of the camera and the successive line images of the item are obtained from successive video lines of the camera.

19 Claims, 4 Drawing Sheets

METHOD AND APPARATUS FOR MEASURING THE COLOR DISTRIBUTION OF AN ITEM

The invention relates to a method of measuring the color distribution of the surface of a spherical item.

BACKGROUND OF THE INVENTION

More particularly, the invention relates to a method of measuring the color distribution of the surface of a spherical vegetable or fruit, such as an apple, a pear, a tomato, a paprika, or an eggplant, so as to enable assessment of the of its color distribution.

Still more particularly, the invention relates to a method of automatically sorting vegetables or fruits on the basis of the color distribution of those vegetables or fruits.

In the art, many methods are known for automatically sorting vegetables or fruits on the basis of color. U.S. Pat. No. 4,106,628, for instance, discloses an apparatus in which each item passes two optical sensors arranged on opposite sides of a conveyor, each detector issues a signal which is representative of the color detected and the two detected color signals are averaged. A disadvantage of this apparatus is that the items must be transported in separate rows, which requires a system of two detectors for each separate row. A further disadvantage of this known apparatus is that it only provides an indication on the color of two opposite surface portions of the item, which colors, moreover, are averaged, while the further surface of the item may deviate strongly from the measured surface portions.

Accordingly, it is an object of the invention to provide a method of the above-mentioned type, in which the entire surface of the item to be measured is detected.

To that end, in a method according to the invention, use is made of a camera and the items are subjected to a rotation of at least 360° within the field of view of the camera.

Also known in the art are methods for evaluating and automatically sorting items using a camera, in which the items are subjected to a rotation of at least 360° within the field of view of the camera. U.S. Pat. No. 5,030,001, for instance, discloses a method for evaluating eggs, in which a gray value is determined for each surface element of an egg, the number of surface elements that have a given gray value are added, and the magnitude of any surface defect is determined on the basis of that addition. This method, however, is not suited for determining the color distribution of a fruit or a vegetable.

It is known in practice that the degree of ripeness of a fruit or a vegetable can be derived from the color of that fruit or vegetable. For instance, anyone will recognize a green tomato as being unripe and a red one as ripe. Between the stages from unripe to ripe, however, a fruit or vegetable will go through different stages of ripeness, in which the tomato of the cited example, for instance, is partly red and partly green. Especially in the vegetable and fruit trade, for instance in evaluating a purchase or in evaluating whether a certain shipment will "survive" transportation abroad, it is desirable that a fairly accurate estimate can be made of the number of days that a product will keep or remain marketable, i.e., it is desirable that its ripeness can be assessed.

At present, in practice, the degree of ripeness is evaluated by so-called inspectors, who assess the ratio of the colors of a product by sight and on that basis judge its ripeness. A disadvantage of such a method is that it is very labour-intensive if it is desired that each product be assessed individually. It will further be clear that such a method of assessment incorporates a substantial element of subjectiveness.

There is accordingly a need for a method and an apparatus for automatically and objectively assessing the degree of ripeness of a fruit or vegetable.

European patent specification 0.105.452 discloses a method for sorting fruit, which also gives an indication of the degree of ripeness of some surface portions of a fruit to be examined. The items to be examined are conveyed in rows past a detection unit and the item to be examined is scanned to form a picture of a linear surface portion of the item, which picture consists of a predetermined number of picture segments. The detection unit comprises a separate detector for each picture segment, while the item to be examined is rotated in the field of view of the detection unit about an axis parallel to the linear surface portion so as to enable the entire surface of the item to be scanned. The measured data of the entire surface of that item are stored in a memory of a computer to be processed further.

A disadvantage of this apparatus is that the items must be transported in separate rows, requiring a detection unit for each row. Further, the detection unit can scan only one item at a time, which has a limiting influence on the processing capacity of the detection unit and hence of the transport and sorting system in which such a detection unit will be utilized.

Further, each detector provides only one analog value for each picture segment, namely, a gray value (number).

A further disadvantage of this known method is that a relatively large memory is required for collecting the measured data. If the number of picture segments in the linear surface portion is represented by D and the number of line scan cycle during a complete rotation of the item to be examined is represented by N, the known method requires a memory of 2×N×D locations to derive from the measured data an indication on the occurrence of blemishes on the surface of the item to be examined. For providing information on the ripeness of a fruit or vegetable to be examined, the known method requires an additional four memory locations for each picture segment, as well as two color filters and two detectors.

A further problem associated with this known method is that during measurement the light rays coming from the item strike the detectors at a varying angle.

SUMMARY OF THE INVENTION

It is an object of the invention to overcome the disadvantages referred to.

More particularly, it is an object of the invention to provide a method of measuring the color distribution of the entire surface of a substantially spherical item, such as a fruit or a vegetable, which method quickly provides an objective and reproducible outcome and requires only a limited storage capacity and a simple processor. Still more particularly, it is an object of the invention to provide such a method which permits simultaneous detection of a plurality of items utilizing a single detector, so that any limitation of the processing capacity is prevented.

A further object of the invention is to provide an apparatus for carrying out the method.

In an important aspect of the invention, use is made of a color camera. Such a camera provides for each pixel a signal that is representative of at least two color contributions and is preferably of the type that detects the colors red and green.

By subjecting the item to be examined to a rotational motion, such that the item makes at least one complete rotation in the field of view of the camera, it is ensured that the entire surface of the item is scanned. Scanning takes place line by line, while the video lines of the camera are directed parallel to the axis of rotation of the item. The collection of line images obtained then forms a representation of the surface of the item.

To limit the memory required for processing the information obtained, for each pixel a color combination signal is derived which is representative of the combination of the intensities of the first and second colors as detected by that pixel. The possible values of the color combination signal have been divided into groups beforehand. The color combination signal obtained for each pixel is compared with the predetermined group classification of the possible values of the color combination signal and for each predetermined group it is counted how many pixels provide a color combination signal of a value associated with that group. The number of locations required for a video line is thereby limited to the predetermined number of groups. The above-described information processing per video line can be performed during or directly after the scan of a video line, while as a consequence of the data reduction achieved, only a simple processor is required for further processing the video line information.

If it is ensured that the item makes precisely one rotation in the field of view of the camera, the collection of line images obtained is exactly a representation of the surface of the item. Counting the number of pixels having a color combination signal that is associated with a given group can then simply be continued, while for obtaining a count result that is exactly representative of the surface of the item, the number of required locations is limited to the predetermined number of groups.

If, however, the item makes more than a complete rotation in the field of view, the collection of line images obtained is over-complete, i.e., a number of the line images obtained occur more than once in the collection referred to. Before a count result can be obtained which is exactly representative of the surface of the item, the collection of line images obtained must be reduced to a collection that corresponds to one rotation. Such a collection of line images representative of the surface of the item is then obtained by taking from the collection referred to a subset of x successive line images, where the ratio of x to the total number of video lines N of the collection referred to is $1:\beta/360°$, where $\beta$ is the angle of rotation the item has travelled through in the field of view.

If the magnitude of $\beta$ is not known until afterwards, the intermediate result of the video lines obtained must be stored in a memory. It is therefore advantageous to determine the magnitude of $\beta$ beforehand, because in that case counting in the locations referred to can be continued for successive line images and discontinued after x video lines have been counted, without additional intermediate memory locations being necessary.

If the method according to the invention is used in a system for transporting, classifying and optionally sorting the items, it is desirable that the items maintain their speed of transport during measurement. It is possible to use a line camera in the method, but then the line camera must be moved along with the moving items. It is therefore preferred to use a matrix camera, which can be mounted stationarily, with the direction of transport of the items being perpendicular to the scanning direction of the video lines. In contrast to what is conventional in the use of a matrix cameras, namely the successive provision and processing of complete pictures, in a preferred embodiment of the invention, only one video line per item is examined, while in correspondence with the displacement of the item within the field of view, the video line examined is a neighboring one of a previously examined video line, preferably such that the video line under instantaneous examination is always directed towards the axis of rotation of the item.

BRIEF DESCRIPTION OF THE DRAWINGS

Further aspects, features and advantages of the present invention will be elucidated by the following detailed discussion of a preferred embodiment, with reference to the accompanying drawings, in which.

DESCRIPTION OF THE PREFERRED EMBODIMENTS

For simplicity's sake, the items 2 to be considered are shown as perfect spheres in the figures. However, items whose surface color distribution can be measured with the apparatus and method according to the invention need not have a perfect spherical shape. Allowable items are vegetables and fruits, such as apples, pears, tomatoes, paprikas, eggplants and the like. Within the framework of the invention, the shape of these items, assumed to be well known, is referred to as "spherical".

The scanning of an item and the processing of the information thereby obtained will be discussed with reference to FIGS. 1–3.

Figure 1A:
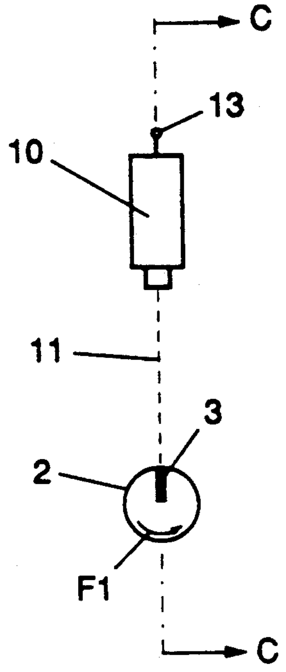
FIGS. 1A and 1C are schematic mutually perpendicular side elevations of a camera device and a spherical item to be examined.
Figure 1B:
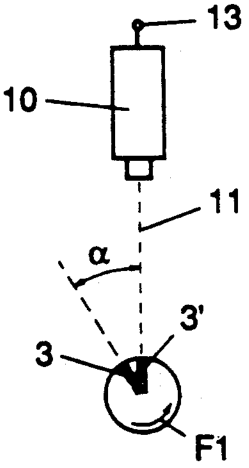
FIG. 1B is a side elevation similar to FIG. 1A at a later time.
Figure 1C:
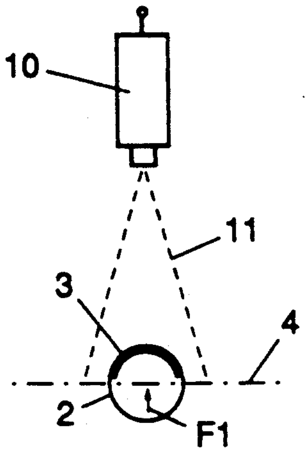
Figure 2A:
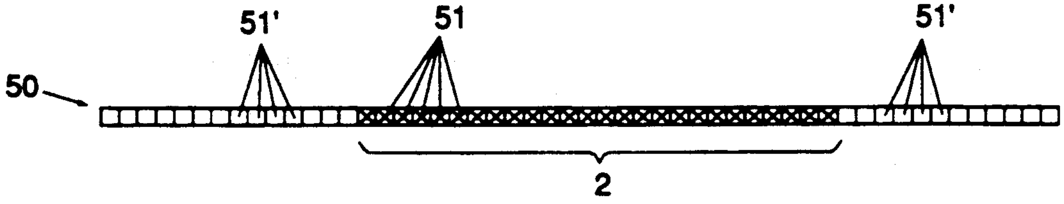
FIG. 2A is a schematic view of a video line.

FIGS. 1A and 1C schematically show mutually perpendicular side elevations of a camera device 10 and a spherical item 2 to be examined. In one scan cycle of the camera device 10, a planar field of view 11 is scanned. Accordingly, a linear portion 3 of the item 2 is scanned and imaged on adjacent picture elements (pixels) of the camera device 10. At an output 13, the camera device 10 provides an electrical signal that is representative of the data contents of the respective pixels.

The set of picture elements obtained in one scan cycle is referred to as a video line. FIG. 2A is a schematic representation of a video line 50 with individual pixels 51, 51', the pixels 51 coming from the linear surface portion 3 of the item 2 and the pixels 51' coming from the part of the field of view 11 on the side of the item 2.

Figure 2B:
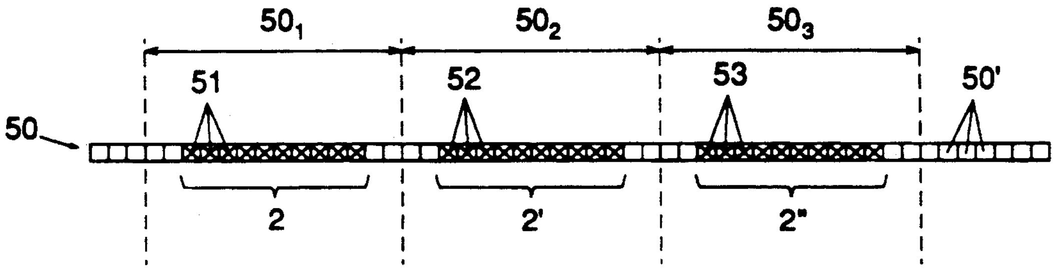
FIG. 2B is a schematic view of a video line of three items.
Figure 3:
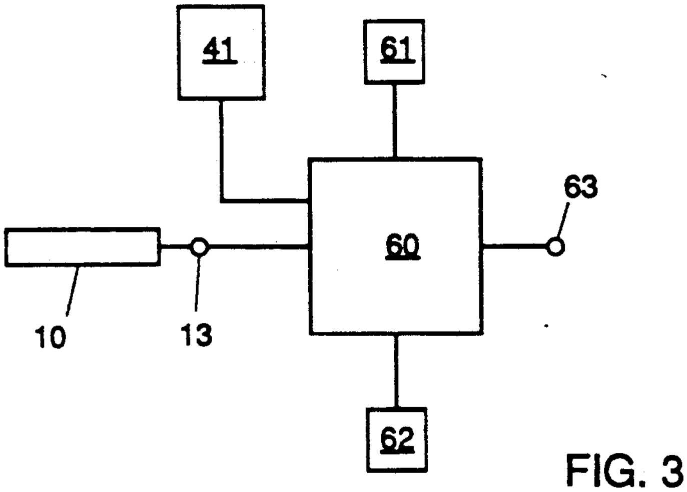
FIG. 3 is a block diagram of the signal processing.

FIG. 2B illustrates the situation where a plurality of items 2, 2', 2" are located within the field of view 11, with pixels 52 coming from the item 2' and pixels 53 coming from item 2". As shown, the video line 50 comprises video line segments $50_1$, $50_2$, and $50_3$, which correspond to positions where an item 2, 2', 2" can be expected, for instance because within the field of view 11 there is arranged a transport means having a plurality of adjacent conveyors, as will be described hereinafter in further detail.

The data contents of a pixel 51 will be referred to by the term pixel signal. The camera device 10 is sensitive to at least two colors, preferably red (R) and green (G), so that the pixel signal comprises at least two components R, G which are representative of the intensity of the at least two colors referred to, which components R, G, will be referred to by the term color signal.

By way of illustrative example, it will now be supposed that the camera device 10 is sensitive to the colors red and green and that each color signal R, G can have the value of an integer between 0 and 15, which is a number between 0000 and 1111 in binary notation.

Beforehand, a number of color categories CC have been determined and for each of the possible combinations of the values of the color signals R, G an associated color category CC has been determined. By way of illustrative example, it is now supposed that there are four color categories, namely, CC1 for "unripe", CC2 for "bloom", CC3 for "ripe", and CC4 for "rotten". The relation between the possible combinations of the values of the color signals R, G and the associated color category CC can be recorded in a table in a memory 61 of a data processing device 60, as illustrated in FIG. 3. It will be clear that a computer can be used as a data processing device 60.

If so desired, for each pixel, first a color combination signal CCS is derived from the two color signals R, G, which is representative of the combination of the intensities of the two colors, in which case the memory 61 of the data processing device 60 may also comprise a table of the relation between the possible values of the color combination signal CCS and the associated color category CC.

Likewise by way of illustration, it will now be supposed that the color combination signal CCS is a binary numeral between 00000000 and 11111111, i.e., an integer between 0 and 255. If the bits of the color signal R are represented by $r_1$, $r_2$, $r_3$, and $r_4$, respectively, and the bits of the color signal G are represented by $g_1$, $g_2$, $g_3$, and $g_4$, respectively, the red/green color combination signal CCS can for instance be formed as $r_1$-$r_2$-$r_3$-$r_4$-$g_1$-$g_2$-$g_3$-$g_4$ or as $r_1$-$g_1$-$r_2$-$g_2$-$r_3$-$g_3$-$r_4$-$g_4$; other combinations are also possible.

It is observed that it is also possible that the camera device 10 directly provides a color combination signal as a pixel signal.

The data processing device 60 further comprises a memory 62 comprising counters CCCj,i, which have been assigned to the color categories CCi and the video line segments 50*j*. The number of counters $CCC_{1,1}$, $CCC_{1,2}$, . . . $CCC_{2,1}$, $CCC_{2,2}$, . . . in the memory 62 is at least as large as the number of color categories CC1, CC2, . . . multiplied by the number of video line segments $50_1$, $50_2$, . . . .

The data processing device 60 receives the electrical signal provided by the output 13 of the camera device 10 and scans the color signals R, G or the color combination signals CCS of the successive pixels 51, 51', 52, 53 in one video line 50.

When the data processing device 60 detects that the instantaneously scanned pixel is a background pixel 51', this pixel is skipped.

When the data processing device 60 detects that within the video line segment $50_1$ the instantaneously scanned pixel 51 corresponds with an item 2, the combination of the values of the color signals R, G or the value of the color combination signal CCS is compared with data priorly fed to the memory 61 and it is determined which of the color categories the value corresponds with. Then a counter value in the memory 62 that corresponds with the color category in question is increased by 1.

Suppose, for instance, that the value of the color combination signal corresponds with the color category CC3 ("ripe"), then the counter value of the counter $CCC_{1,3}$ is increased by 1 by the data processing device 60.

When the data processing device 60 detects that within the video line segment $50_2$ the instantaneously scanned pixel 52 corresponds with an item 2' and the combination of the values of the color signals R, G or the value of the corresponding color combination signal CCS corresponds with the color category CC1 ("unripe"), then the counter value of the counter $CCC_{2,1}$ is increased by 1 by the data processing device 60.

In this way, the entire video line 50 is scanned and processed. It will be clear that the above-described processing can be carried out with a relatively simple processor, that the required number of memory locations (counters) can be relatively small, and that the result of the processing is available directly after the scan of the video line.

During the scan, the item 2 is rotated about an axis of rotation 4, so that in a subsequent scan cycle a next linear portion 3' of the surface of the item 2 is scanned, which next linear portion 3' is displaced in circumferential direction relative to the previous linear portion 3 through an angle $\alpha$, as shown in an exaggerated fashion in FIG. 1B. The magnitude of the angle $\alpha$ is determined by the velocity of rotation of the item 2 and the duration of a scan cycle of the camera device 10, as will be clear to someone skilled in the art.

When the item 2 has thus made one complete rotation during the scan by the camera device 10, the camera device 10 has at least substantially completely scanned the surface of the item 2. The counter values of the counters $CCC_{1,1}$, $CCC_{1,2}$, . . . are then representative of the color ratio of the surface of the examined item 2 and can be provided at an output 63 of the data processing device 60 as input data for a sorting station (not shown). If so desired, the data processing device 60 first performs an operation on the counter values of the counters $CCC_{1,1}$, $CCC_{1,2}$, . . . For instance, it can be desirable to provide the color ratio data only in percentages. In that case, in the above-mentioned example, the data processing device 60 can for instance e adapted to provide a bloom percentage for the item 2 according to the formula:

$$\text{"bloom" percentage} = \frac{CCC_{1,2}}{\sum_i CCC_{1,i}} \times 100\% \quad (1)$$

In the above, it has been supposed that the item 2 has made precisely one rotation in the field of view 11 of the camera device 10. This could be effected by providing means to ensure that each item 2 makes precisely one rotation. However, since in practice a series of items 2 must be assessed and such successive items do not in general have the same dimensions, it is preferred to allow all items to make more than one rotation and to further process only such information as corresponds to one complete rotation. Accordingly, the information that corresponds with surface portions that have been scanned more than once is used only once. Hereinafter two variants of such a method will be further discussed.

In a first variant, during or after rotation and scanning, it is determined at which time the item 2 in question has made one complete rotation. The manner in which this is effected is not essential. In the following discussion of one embodiment of an apparatus for carrying out the method according to the invention, an example will be described of a method for determining when the item 2 in question has made a complete rotation.

The method described hereinabove for obtaining color signals and/or color combination signals, processing these signals and storing the processed signals in the memory 62 of the data processing device 60 can then simply be discontinued when the above-mentioned moment has been reached.

In a second variant, the information of all video lines 50 obtained during rotation in the field of view 11 is stored in respective intermediate memories, which does allow information from each video line 50 to be processed separately in the manner described hereinabove. In that case, the memory 62 comprises, for each color category i and each item j in the field of view 11 of the camera 10, at least N intermediate counters (CI(n)j,i ($1 \leq n \leq N$), where N equals the number of video lines 50 that are obtained from the rotating item 2. The method described hereinabove is then carried out with the understanding that for a video line 50 having rank number n the associated counter CI(n)j,i is used.

After the item 2 has been scanned in the field of view 11 through more than one rotation, the processed information of each video line 50 is then available in the respective counters CI(n)j,i.

Then, on the basis of the number of video lines x that corresponds to one complete rotation of the item 2, for each i and j, the information of x successive counters CI(n)j,i is processed and the result is stored in the counters CCCj,i. In that case, use can for instance be made of the first x successive counters CI(n)j,i or of the intermediate x counters. Generally, the value to be registered in each counter CCCj,i is calculated according to the formula $$CCC_{j,i} = \sum_{n=a}^{a+x-1} CI(n)_{j,i} \quad (2)$$

wherein a is a random predetermined number of a value between 1 and $N-x+1$.

EXAMPLE

Suppose that seven video lines 50(1)-50(7) are obtained from the item 2, with the values of the color signals R and G for each of the pixels as shown in Table 1.

TABLE 1

| video line | color signals R/G | | | | | | | |
|---|---|---|---|---|---|---|---|---|
| 50(1) | .. | 15/1 | 14/1 | 14/2 | 7/7 | 3/10 | 3/12 | .. |
| 50(2) | .. | 14/1 | 14/2 | 13/3 | 12/4 | 8/8 | 4/11 | .. |

TABLE 1-continued

| video line | color signals R/G | | | | | | | |
|---|---|---|---|---|---|---|---|---|
| 50(3) | .. | 14/1 | 14/3 | 10/4 | 7/5 | 5/10 | 3/13 | .. |
| 50(4) | .. | 13/1 | 13/2 | 6/8 | 3/13 | 2/14 | 2/14 | .. |
| 50(5) | .. | 15/1 | 14/1 | 14/2 | 7/7 | 3/10 | 3/12 | .. |
| 50(6) | .. | 15/1 | 14/1 | 14/2 | 7/7 | 3/10 | 3/12 | .. |
| 50(7) | .. | 14/1 | 14/2 | 13/3 | 12/4 | 8/8 | 4/11 | .. |

Suppose further that the predetermined relation between the value of the color signals R and G and the color categories satisfies the following rules:

$$R-G>2 \text{ corresponds with CC3 ("ripe")} \quad (3)$$

$$-2 \leq R-G \leq 2 \text{ corresponds with CC2 ("bloom")} \quad (4)$$

$$R-G<-2 \text{ corresponds with CC1 ("unripe")} \quad (5)$$

Operative for the item 2 in question are twenty-one intermediate counters $CI(n)_{1,i}$, set at zero at the outset of the processing procedure.

During the scan of the video line 50(1) it is determined for the first pixel, in accordance with rule (3), that the value of the intermediate counter $CI(1)_{1,3}$ must be increased by one and hence acquires the value 1. For the second pixel it is likewise determined that the value of the intermediate counter $CI(1)_{1,3}$ must be increased by one and hence obtains the value 2.

After the scan of all the video lines 50(1)-50(7) the values of the intermediate counters $CI(1)_{1,i}$ are as shown in Table 2.

TABLE 2

| n | counter values $CI(1)_{1,i}$ i=1 | i=2 | i=3 |
|---|---|---|---|
| 1 | 2 | 1 | 3 |
| 2 | 1 | 1 | 4 |
| 3 | 2 | 1 | 3 |
| 4 | 3 | 1 | 2 |
| 5 | 2 | 1 | 3 |
| 6 | 2 | 1 | 3 |
| 7 | 1 | 1 | 4 |

Suppose further that it is determined that the number of successive video lines 50 that corresponds to one complete rotation of the item 2 equals 5 ($x=5$). In that case, for the assessment of the item 2, for each i, only the contents of five successive intermediate counters $CI(1)_{1,i}$ are processed, for instance (with $a=2$ in formula (2)), the successive intermediate counters $CI(2)_{1,i}$ through $CI(6)_{1,i}$.

This results in the following values for the color category counters $CCC_{1,i}$:

$$CCC_{1,1}=10;\ CCC_{1,2}=5;\ CCC_{1,3}=15$$

which are applied to the output 63 of the data processing device 60 as sorting information representative of the surface of the item 2.

Figure 4:
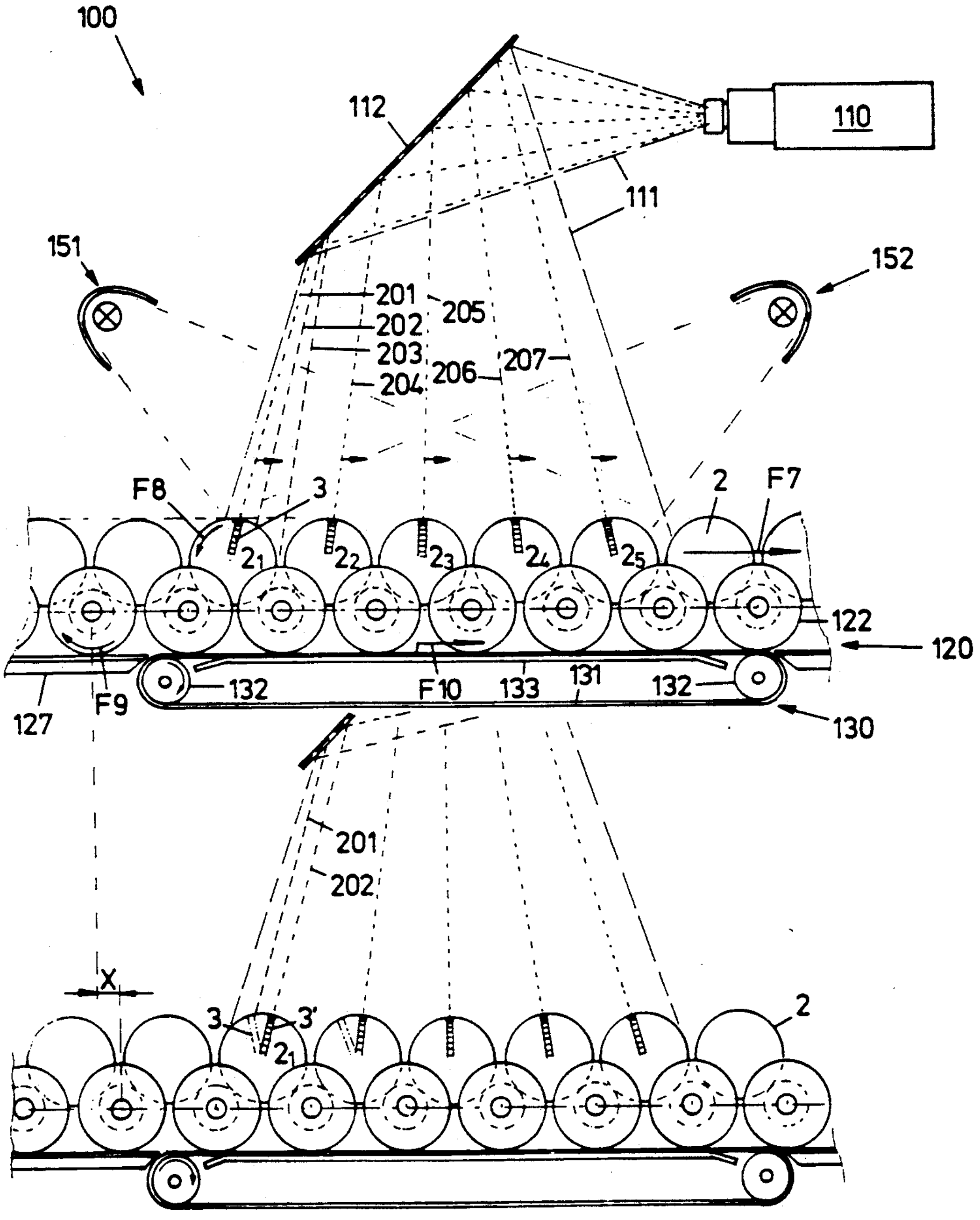
FIG. 4 is a schematic side elevation of a preferred embodiment of an apparatus for carrying out the method according to the invention.

FIG. 4 illustrates a preferred embodiment of an apparatus for carrying out the method according to the invention. As a camera device, a matrix color camera 110, for instance a CCD color camera, is used. This enables scanning of a plurality of items 2, side by side as well as behind each other. The items may be spaced apart a relatively minor distance, which increases the allowable transport capacity.

The apparatus 100 further comprises means 120 for conveying the items 2 through a field of view 111 of the matrix camera 110.

In FIG. 4, the field of view 111 of the matrix camera device 110 is bound by broken lines. FIG. 4 further shows that a mirror 112 can be arranged in front of the matrix camera device 110. The point of such an arrangement is merely to limit the practical overall height of the apparatus 100, as is well known as such.

The means 120 are arranged to transport the items 2 from left to right, as indicated by the arrow F7 in FIG. 4, through the field of view 111 at a velocity of translation of $v_7$ and further to impart a rotation to the items 2 as indicated by the arrow F8 in FIG. 4, the axis of rotation directed perpendicular to the direction of transport F7.

In the embodiment shown in FIG. 4, the means of transportation 120 comprise a roller conveyor 121. Such a roller conveyor 121, shown in plan view in FIG. 5, comprises mutually parallel rollers 122 having their ends 123 rotatably mounted to an endless chain 124 at equal interspaces. The chain 124 is for instance mounted on two chain wheels and one of the chain wheels can be driven by a motor, as is known as such. Since the nature and construction of the drive for the chain 124 are not part of the present invention and a skilled person need not have any knowledge thereof to properly understand the present invention, they will not be further discussed here.

Figure 5:
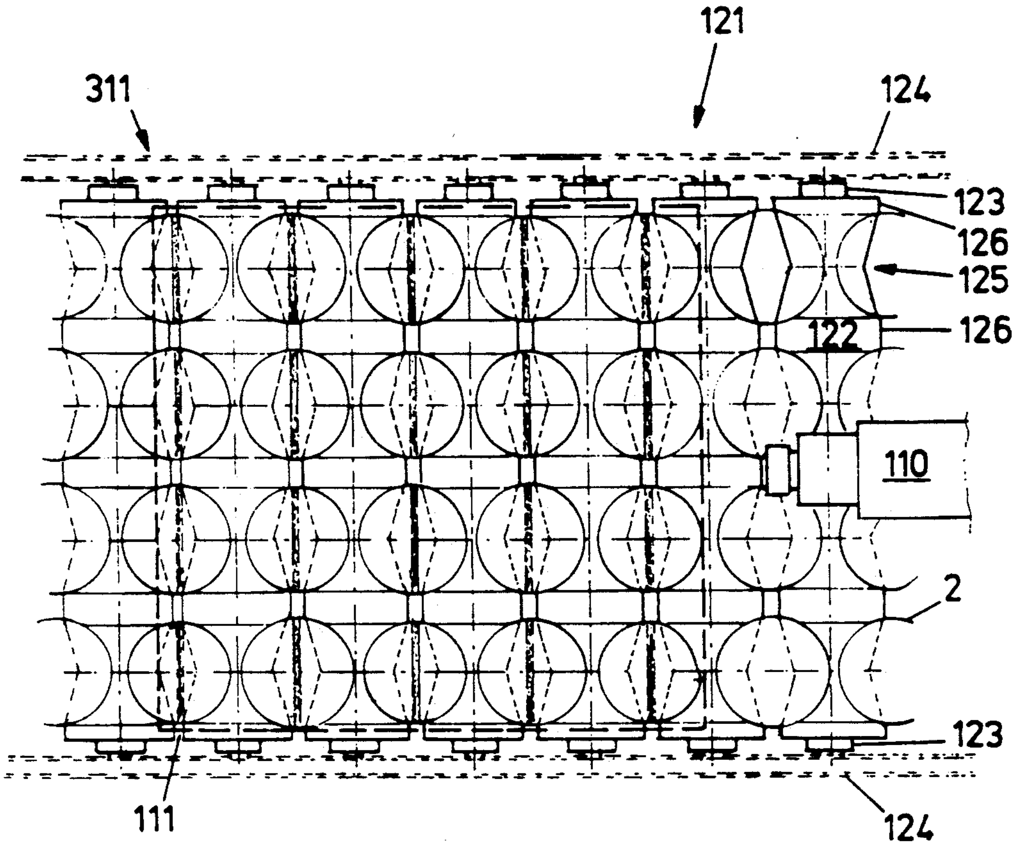
FIG. 5 is a schematic top plan view of the apparatus of FIG. 4.

The rollers 122 have a substantially cylindrical shape and can have a contour suitable for centering and rotating the items. In particular, they have at least one portion 125 of reduced diameter, which is bounded on opposite sides by portions 126 of greater diameter. The portions 125 are intended for receiving an item 2, which is carried by the portions 125 of two adjacent rollers 122, as is shown clearly in FIGS. 4 and 5. FIG. 5 further shows that each roller 122 can have a plurality of portions 125 for side-by-side transportation of a plurality of items 2.

It is noted that the rollers 122 may be provided with a surface material and/or a surface structure which is suitable for providing a good grip on the items 2 so as to rotate them substantially without slip. The rollers 122 may for instance be provided with longitudinal grooves and coated at least partly with rubber or, preferably, be made entirely of rubber.

When the chain 124 is driven, the rollers 122 are translated perpendicularly to their axes, in a direction and at a velocity which is determined by the velocity of travel of the chain 124 and corresponds with the translation of the items 2 indicated by the arrow F7. The rollers 122 are supported by a supporting surface 127 arranged stationarily relative to a machine frame. As a result of the friction between the supporting surface 127 and the rollers 122, each roller will also perform a rotation, as indicated by the arrow F9 in FIG. 4. As a result of this rotation of the rollers 122, the items 2 supported by the rotating rollers 122 will perform the opposite rotation (F8). In this connection, there is a fixed correlation between the velocity of rotation $\theta_8$ of the items 2 and the velocity of rotation $\theta_9$ of the rollers 122. Further, there is a fixed correlation between the velocity of rotation $\theta_9$ and the velocity of translation $v_7$: if there is no slip, this correlation is defined by the formula $$v_7 = R_{126} \cdot \theta_9 \quad (6)$$

where $R_{126}$ is the radius of the portions 126 of the rollers 122.

This means that the distance travelled by an item 2 in the direction of translation, corresponding with one complete rotation of the item 2, hereinafter referred to as the characteristic distance of translation, is fixed and is dependent only on the diameters of the roller portions 125 and 126, the size of the item in question and, if such item has a slightly irregular shape, which will often be the case in practice, on the exact point where such item contacts the rollers 122.

Generally, this characteristic translation distance will not correspond with the length of the field of view 111. This is to say that if no further steps were taken to change the velocity of rotation of the items 2, the items 2 would generally make a number of rotations in the field of view 111 far in excess of one. As shown in FIG. 4, the apparatus 100 is therefore preferably provided with means 130 to change the velocity of rotation $\theta_9$ of the rollers 122 and hence the velocity of rotation $\theta_8$ of the items 2. In the embodiment shown, the means 130 comprise an endless friction belt 131 arranged at the field of view 111. The endless belt 131 is for instance mounted on wheels or rollers 132, of which one can be driven by a motor (not shown), as is known. The belt 131 has its top run arranged level with the supporting surface 127 and can be supported between the wheels or rollers 132 by a stationary supporting surface 133 so as to prevent sagging.

By choosing a suitable value for the velocity and direction of rotation of the wheels or rollers 132, the velocity of rotation $\theta_8$ of the items 2 can be adjusted without changing the velocity of translation $v_7$ of the items 2, so that the characteristic translation distance can be adjusted to the length of the field of view 111. This can be seen as follows. If the belt 131 is stationary, the velocity of rotation of the rollers 122 adjacent the belt 131 is equal to the velocity of rotation of the rollers 122 adjacent the supporting surface 127 and therefore no change has taken place. If the direction of translation of the belt 131 has been chosen to be equal to the direction of translation of the rollers 122, as indicated by the arrow F10 in FIG. 4, the velocity of rotation of the rollers is reduced. If the belt 131 has a velocity of translation of between zero and the velocity of the rollers 122, the velocity of rotation of the rollers 122 has a value between zero and the velocity of rotation of the rollers 122 at the supporting surface 127.

If the velocity of translation of the belt 131 has been selected to be greater than that of the rollers 122, the direction of rotation of the rollers 122, and hence of the items 2, is reversed.

The speed of the belt 131 is so chosen that items of a maximum expected size will make precisely one complete rotation in the field of view 111. It is readily seen that items of a smaller size will then make more than one complete rotation in the field of view 111.

Now follows a further explanation of how line images are made using a matrix camera.

The field of view 111 of the camera 110 in fact consists of a set of successive view planes 201, 202, 203, 204, 205, etc. Each view plane corresponds with a video line of the camera 110. A linear portion 3 of the surface of an item 2 which is in the view plane 201 will accordingly be imaged on the video line of the camera 110 that corresponds with the view plane 201. If, as illustrated in FIG. 4, the axis of rotation of an item 2 is in the view plane 201, the contents of the pixel elements of the video line of the camera 110 that corresponds with the plane 201 are interpreted as a line measurement of the surface of the item 2 in question in a manner comparable to that described hereinabove. The contents of the video lines of the camera 110 that correspond with the planes 202, 203 are not now regarded as the outcome of a measurement because the view planes referred to are not directed to the centre of an item. In the situation illustrated in the upper part of FIG. 4, therefore, only the contents of the video lines corresponding with the planes 204, 205, 206, and 207 are interpreted as the outcome of a line measurement with respect to the items $2_2$, $2_3$, $2_4$, $2_5$, respectively.

Illustrated in the lower part of FIG. 4 is the situation where the rollers 122 have been displaced over a certain distance x. The centre of the item $2_1$ is now located in the plane 202, so that now the contents of the video line of the camera 110 that corresponds with the plane 202 are interpreted as the outcome of a line measurement of a linear portion 3' of the surface of the item $2_1$. The contents of the video line of the camera 110 that corresponds with the plane 201 are not now interpreted as the outcome of a measurement.

As will be clear from FIG. 4, with the displacement over the distance x, the item $2_1$ has been rotated through a certain angle, so that the linear portion 3' of the surface of the item $2_1$ differs from the linear portion 3 (see also FIG. 1B).

Upon further displacement in the direction F7 and rotation of the items in the direction F8, therefore, successively a next linear portion of the surface of the item $2_1$ will be imaged on a video line of the camera 110 that corresponds with a next view plane.

It is observed that when a "next" line measurement is being carried out, if so desired, in each case one or more video lines can be skipped, for instance when the information coming from the video lines that are actually used is an adequate representation of the surface of the item. If so desired, each line measurement may also relate to the picture elements of two or more neighboring video lines simultaneously.

During the transport of the rollers 122 through the field of view 111 of the camera 110, a plurality of items can be measured simultaneously. As is clearly shown in FIG. 4, the field of view 111 of the camera 110 can cover a plurality of items $2_1$, $2_2$, etc. in the direction of translation F7. Likewise, the field of view 111 of the camera 110 can be large enough to cover a plurality of items 2, 2', 2", etc. side by side, as shown in FIGS. 5 and 6.

FIG. 5 illustrates an embodiment of the apparatus 100 in which the rollers 122 have been arranged to transport four items in side by side relation through the field of view 111 of the camera 110.

Figure 6:
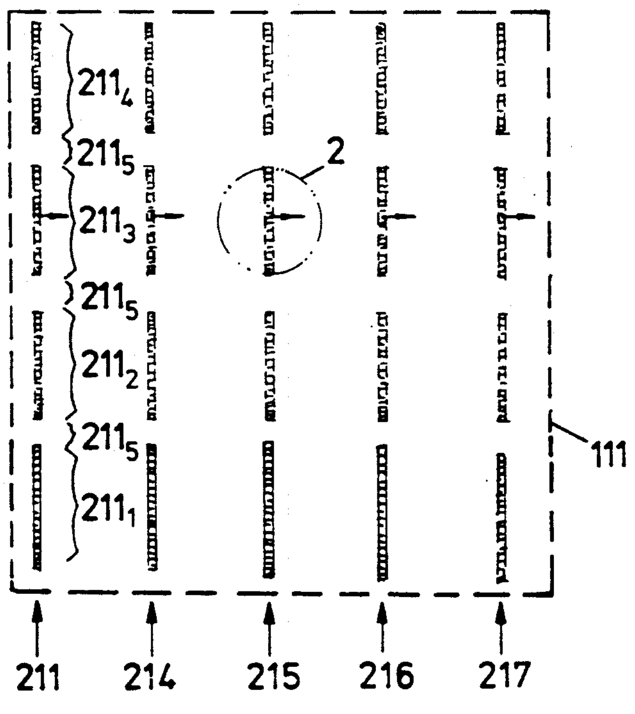
FIG. 6 is a schematic view of a picture obtained with a matrix camera.

FIG. 6, in further elucidation, shows a momentary picture of the image obtained with the camera 110. The rectangle indicated by broken lines represents the field of view 111 of the camera 110. The chain-dotted circle indicates the instantaneous position of an item 2 in the field of view 111. FIG. 6 further shows a video line 215 where at that time an image is made of the central portion of the item 2 shown. FIG. 6 further indicates four video lines 211, 214, 216 and 217 where likewise the centre of an item 2 is imaged. The picture of the camera shown in FIG. 6 can be considered to correspond with the situation illustrated in the upper part of FIG. 4, the video line 211 corresponding with the plane 201, the video line 214 corresponding with the plane 204, etc., while the video line elements $211_1$, $211_2$, $211_3$ and $211_4$ respectively correspond with the four items located side by side on the roller 122, as shown in FIG. 5 at 311. The video line elements referred to are separated by video line elements $211_5$ whose contents do not correspond with an item 2. Shown in similar manner are the video line elements of the video lines 214, 215, 216 and 217, which correspond with items.

It is observed that the division of each video line into video line segments, as discussed with reference to FIG. 2B, is defined by the positions of the conveyors as defined by the narrower portions 125 of the rollers 122.

It is observed that the camera 110 scans the field of view 111 line by line. In the situation illustrated in the upper part of FIG. 4, where the planes 201 and 204 (FIG. 6) are directed to the axes of rotation of items and the information of the video lines 211 and 214 is processed, the information of the video lines between the video lines 211 and 214 is not processed, so that during that time the data processing device 60 has sufficient opportunity to carry out calculations. For that matter, the same applies to the video line portions $211_5$ between the items.

Now the control of the embodiment of FIGS. 4–6 will be further described.

When the apparatus is in the situation shown in the upper part of FIG. 4, corresponding with the picture illustrated in FIG. 6, a control device 41 (see FIG. 3) commands the information processing device 60 to process the pixel signals of the video line elements $211_1$ through $211_4$ of the video line 211 and to update the relevant counter in the memory 62 and optionally to register these pixel signals in respective locations in the memory 62. Of course, the same applies to the video lines 214, 215, 216, and 217. When the apparatus is in the situation illustrated in the lower part of FIG. 4, i.e., when the rollers 122 of the transport means 120 have been displaced over the distance x, the control device 41 gives instructions to process the pixel signals of the video line portions $212_1$ through $212_4$ of the video line 212 (not shown in FIG. 6) disposed next to the video line 211 and corresponding to the plane 202.

When an item has thus traversed the entire field of view 111, a color-measurement operation has been performed on its entire surface.

The above-mentioned distance x which the rollers 122 must traverse to transport the items from one view plane to a successive view plane, which distance x is shown in an exaggerated fashion in FIG. 4, has a fixed value in a given configuration. To perform the color measurements at the proper times, the control device 41 must know when such distance x has actually been traversed. For that purpose, the transport means 120 may be provided with means for measuring the distance covered by the transport means 120 and for passing on the outcome to the control unit 41. Such means are known per se. It is also possible to provide the transport means 120 with means for measuring the speed thereof and hence to provide the measured speed to the control unit 41. From that outcome, the control unit 41 can then calculate the time $t_x$ which the transport means 120 requires to cover the distance x referred to. It is also possible to input $t_x$ as a fixed value into the memory 62.

To determine when the item 2 has made a complete rotation in the field of view 111 of the camera 110, first the circumference of the item 2 can be determined, in view of the fact that the circumference of the item 2 relative to the relevant dimensions of the rollers 122 is a measure for the characteristic translation distance. The circumference of the item 2 can be determined by measuring the diameter of the item 2, in the direction of transport indicated by F7, utilizing a separate measuring device such as a photo cell, through measurement of the time it takes the item 2 to pass the photo cell.

It is also possible to obtain a measure for the size of the item 2, and hence for its circumference, by carrying out a weight measurement.

It is also possible to determine the diameter of the item 2 by image-processing the picture obtained from the item 2, as will be clear to a person skilled in the art. In that case, the diameter can be directly determined in the direction of transport when use is made of a matrix camera, for instance by counting the number of video lines that simultaneously contain picture elements coming from the item. By detecting which are the relevant video lines as well as the change thereof with time, the displacement of the item can be detected. In this manner it can also be detected which video line is the video line that is directed towards the centre of rotation of the item, for instance by detecting which video line contains most picture elements coming from an item.

A further improvement of the apparatus according to the invention consists in the provision of at least one light source 151, 152, which is arranged beside the field of view 111 and illuminates the items 2 in the field of view substantially obliquely. In the embodiment shown, two light sources 151 and 152 are shown which are arranged on opposite sides of the field of view 111. In practice, preferably four of such light sources are arranged adjacent the corners of the field of view 111. The light sources 151 and 152 are preferably arranged downstream and upstream, respectively, relative to the field of view 111 and preferably provide a homogeneous light intensity across the width of the conveyor 120 so as to provide the field of view 111 with a balanced lighting while any shadow of the items 2 will not influence the measurements. The oblique arrangement prevents the possibility that glaring spots on the items intersect the view planes and thereby disturb the measurements. Another step towards eliminating any glare is the use of a polarization filter for the camera 110 and the light sources 151, 152, the polarization filters for the light sources being of mutually parallel orientation in a polarization direction perpendicular to that of the polarization filter for the camera 110.

In practice it may happen that two different picture elements of the matrix camera 110 give a different response to the same surface portion of an item. This may be caused by deviations among the picture elements themselves, but also by incompletely homogeneous illumination of the field of view 111. At such places where the field of view 111 has a greater light intensity, the same surface portion of an item will provide a greater light signal to a pixel, so that this pixel will provide a greater measured value. In order to counteract this effect, optionally the pixels of the matrix camera can be calibrated relative to each other by performing a test measurement, prior to the color measurement, on a smooth test surface of a known color, located in the field of view 111. If all is in order, the pixels should all provide the same measured value. Mutual variations point for instance to local variations in light intensity. These variations can be recorded in an auxiliary memory which contains a correction value for each pixel. While the actual color measurements are being performed, the measured values of each pixel, before being processed further, can be corrected by substituting the corresponding correction value. Although this requires a relatively large amount of memory space, a considerable improvement of measurement precision is achieved.

Optionally, the apparatus 100 may comprise a computer and a color monitor. In that case, it is possible to display a two-dimensional picture of the surface color of a single item. Naturally, this requires that each pixel signal obtained from the item is stored in a memory for the monitor.

It will be clear to those skilled in the art that the embodiment of the apparatus according to the invention as shown can be changed or modified without departing from the inventive concept or the scope of protection. Thus, it is for instance possible to utilize a camera which is designed to directly provide a color combination signal. It is also possible to input evaluation criteria manually, such as the formulae (3)-(5) mentioned above, but it is also possible to operate the apparatus in a "learning phase", wherein a series of characteristic items whose corresponding color category is known, are input and measured, while the measured signal values are stored in the table as being correspondent with the known color category.

Further, it will be clear to those skilled in the art that the embodiment discussed in the foregoing can simply be modified when use is made of a camera device that is sensitive to three or more colors. It will also be clear to those skilled in the art that, instead of adjusting the velocity of rotation of the items to the dimensions of the field of view of the camera, the dimensions of the field of view of the camera can be adjusted to the velocity of rotation of the items.

I claim:

1. A method of measuring color distribution of the surface of at least one spherical item using a color camera having a defined field of view, comprising the steps of:

a) deriving from a pixel signal provided by a pixel of a video line of the color camera directed toward the spherical item at least a first color signal which is representative of the intensity of a first preselected color as detected by said pixel and at least a second color signal which is representative of the intensity of a second preselected color as detected by said pixel;

b) comparing a combination of values of at least the said first and second color signals with a predetermined correlation between possible combinations of values of the color signals and a predetermined number of color categories, so as to determine which of the color categories the combination of values corresponds;

c) increasing by 1 a counter value of a counter corresponding to the determined color category;

d) repeating the steps a) through c) for a succession of pixels belonging to said video line;

e) repeating the steps a) through d) for a succession of video lines while the spherical item makes at least one complete rotation in the field of view of the color camera; and f) comparing in a data processing device counter values obtained with a predetermined sorting criteria of values for said spherical item.

2. A method as claimed in claim 1, wherein in step d) the steps a) through c) are repeated for a succession of pixels belonging to at least one neighboring video line.

3. A method as claimed in claim 1, wherein in step e) one or more of said video lines are skipped.

4. A method as claimed in claim 1, wherein the spherical item makes substantially one complete rotation in the field of view of the color camera.

5. A method as claimed in claim 1, wherein the spherical item makes more than one complete rotation in the field of view of the color camera and in step e) the steps a) through d) are repeated only until the spherical item has made substantially precisely one complete rotation in the field of view.

6. A method as claimed in claim 1, wherein the spherical item makes more than one complete rotation in the field of view and further comprises the steps of determining a magnitude of the angle of rotation that the spherical item traverses through in the field of view of the camera;

after step d) the counter values of the counters are stored in cache memories corresponding to respective video lines;

after step e) for each color category the contents of only a part of the cache memories are added, which part corresponds with substantially precisely one rotation of the spherical item.

7. A method as claimed in claim 1, wherein a video line can contain pixels that correspond with different spherical items.

8. A method as claimed in claim 1, wherein the camera is a matrix camera;

the spherical item is transported in a preselected direction through the field of view of the matrix camera;

after step d), and prior to step e), a selected neighboring video line is displaced relative to a preceding video line in the direction of transport of the spherical item; and wherein the selected neighboring video line is directed to an axis of rotation of the spherical item.

9. A method as claimed in claim 8, wherein the field of view includes pixels that correspond to different spherical items in the said direction of transport.

10. A method as claimed in claim 1, wherein a plurality of spherical items are transported and rotated in the field of view by a roller conveyor and rollers thereof, at least at locations in the field of view, rest on an endless friction belt whose speed of travel can be set, so as to influence a velocity of rotation of the rollers.

11. A method as claimed in claim 10, wherein speeds of travel of the endless friction belt are chosen such that a largest spherical item makes exactly one rotation during transport through the field of view.

12. A method s claimed in claim 1, wherein pixels are calibrated relative to each other by measurement of a smooth test surface of a known color.

13. A method as claimed in claim 12, wherein said combination of values are corrected by said calibration.

14. An apparatus for carrying out the method as claimed in claim 1, comprising:

a transport means for transporting items in rotating manner through matrix field of view of a matrix camera; and means for influencing a velocity of rotation of the items.

15. An apparatus s claimed in claim 14, wherein the transport means comprises a roller conveyor whose rollers, at least at locations in the field of view, rest on an endless friction belt.

16. An apparatus as claimed in claim 14, wherein on opposite sides of the matrix field of view at least one light source is arranged to obliquely illuminate the items.

17. An apparatus as claimed in claim 14, wherein in front of the matrix camera and in front of each lamp, polarization filters are arranged, the polarization filters arranged for different lamps being of the same orientation and the polarization filters arranged in front of the matrix camera having an orientation rotated 90° relative to the orientation of the polarization filters arranged in front of the lamps.

18. An apparatus as claimed in claim 14, wherein there are provided a computer and a color monitor to present pixel signals obtained from an item so as to form a color picture of the entire surface of that item.

19. A method for automatically sorting a plurality of items of vegetables or fruit on the basis of color distribution of said vegetables or fruits, said color distribution being measured utilizing a color camera, comprising the following steps:

a) deriving from a pixel signal provided by a pixel of a video line of the color camera directed toward an item at least a first color signal which is representative of the intensity of a first preselected color as detected by said pixel and at least a second color signal which is representative of the intensity of a second preselected color as detected by said pixel;

b) comparing a combination of values of at least the said first and second color signals with a predetermined correlation between possible combinations of values of the color signals and a predetermined number of color categories, so as to determine which of the color categories the combination of values corresponds;

c) increasing by 1 a counter value of a counter corresponding to the determined color category;

d) repeating the steps a) through c) for a succession of pixels belonging to said video line;

e) repeating the steps a) through d) for a succession of video lines while at least one said item makes at least one complete rotation in the field of view of the color camera; and f) comparing in a data processing device counter values obtained with a predetermined sorting criteria of values for said items.

* * * * *